(12) United States Patent
Walton

(10) Patent No.: US 9,108,305 B2
(45) Date of Patent: Aug. 18, 2015

(54) ENGAGEABLE HANDLE FOR GARBAGE DISPOSAL

(75) Inventor: Nicholas Walton, Bend, OR (US)

(73) Assignee: Tiffany Walton, Beverly Hills, CA (US)

( * ) Notice: Subject to any disclaimer, the term of this patent is extended or adjusted under 35 U.S.C. 154(b) by 0 days.

(21) Appl. No.: 12/614,328

(22) Filed: Nov. 6, 2009

(65) Prior Publication Data

US 2011/0016683 A1    Jan. 27, 2011

Related U.S. Application Data

(60) Provisional application No. 61/112,601, filed on Nov. 7, 2008.

(51) Int. Cl.
*E03C 1/042* (2006.01)
*B23P 19/04* (2006.01)
*B25B 13/48* (2006.01)
*B65G 7/12* (2006.01)

(52) U.S. Cl.
CPC . *B25B 13/48* (2013.01); *B65G 7/12* (2013.01); *Y10T 29/53687* (2015.01)

(58) Field of Classification Search
CPC ............. B25B 13/48; B67B 7/18; B65G 7/12
USPC ........... 29/240, 244, 278, 270; 4/695; 254/25, 254/21; 269/3, 6; 81/436, 176.15, 124.2, 52
See application file for complete search history.

(56) References Cited

U.S. PATENT DOCUMENTS

| | | | | | |
|---|---|---|---|---|---|
| 2,990,213 | A | * | 6/1961 | Kolacinski | 294/118 |
| 4,632,442 | A | * | 12/1986 | Gerding | 294/16 |
| D307,701 | S | * | 5/1990 | Planchon | D8/40 |
| 6,189,421 | B1 | * | 2/2001 | Futo et al. | 81/64 |
| 6,202,517 | B1 | * | 3/2001 | Dolan | 81/427 |
| 6,839,949 | B1 | * | 1/2005 | Miknich | 29/402.19 |
| 6,964,089 | B2 | * | 11/2005 | Ramirez | 29/450 |

OTHER PUBLICATIONS definition of "Notch" in Collins English Dictionary online <http://www.collinsdictionary.com/dictionary/english/notch>.*

* cited by examiner

*Primary Examiner* — Lee D Wilson
*Assistant Examiner* — Seahee Yoon
(74) *Attorney, Agent, or Firm* — Donn K. Harms

(57) ABSTRACT

A tool employable to install a garbage disposal supported in an elevated position by a mounting ring rotationally engaged to a sink flange extending from a drain. The device provides one or a plurality of handles extending from a supporting member adapted to cradle or engage with projections extending from the mounting ring. With the supporting member engaged to the mounting ring the user may employ two hands to lift the mounting ring and disposal and concurrently twist the mounting ring onto the sink flange.

4 Claims, 3 Drawing Sheets

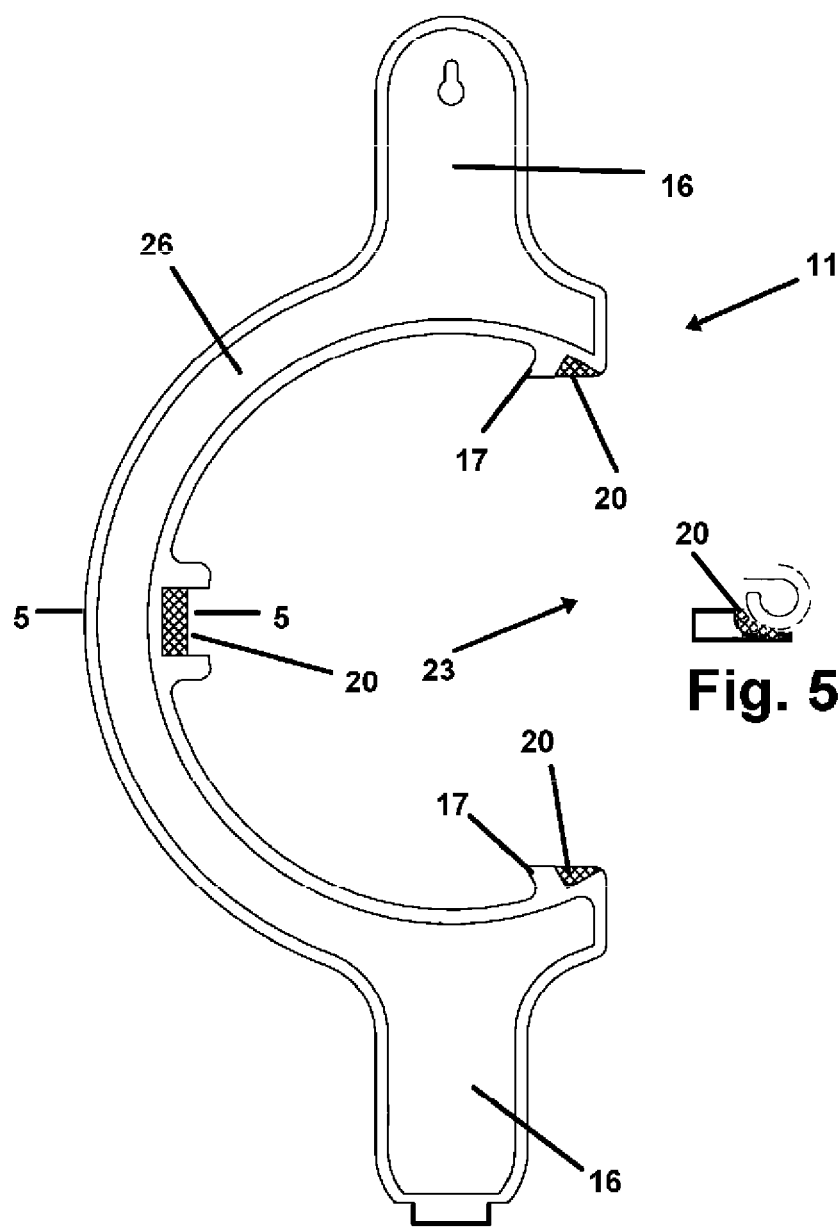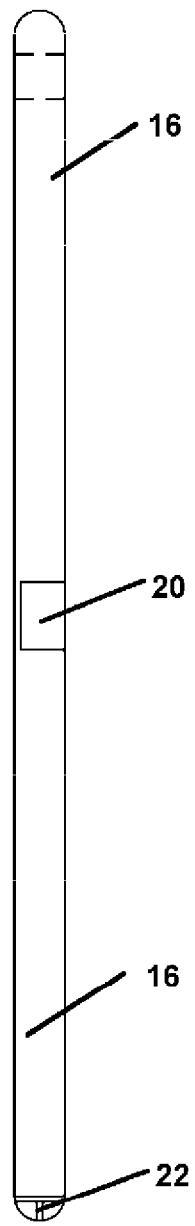
Fig. 4  Fig. 5  Fig. 6

ENGAGEABLE HANDLE FOR GARBAGE DISPOSAL

This application is a Continuation in Part of U.S. Provisional Patent Application No. 61/112601, filed Nov. 7, 2008 and which is incorporated herein in its entirety by reference.

FIELD OF THE INVENTION

The disclosed device relates to plumbing connectors. More particularly, it relates to a handle forming a combination wrench and lifting component when engaged to a conventional rotatably engaging connector of a garbage disposal to a sink. So engaged, the device allows the user to concurrently hold the disposal elevated with one or both hands and to easily maintain the disposal elevated and in the same plane with the rotationally engaged connector which is engaged by a twisting of the handles.

BACKGROUND OF THE INVENTION

In modern countries, the garbage disposal has become a common fixture to the sinks of homes and businesses. Essentially the disposal is a grinder affixed to a drain outlet under the sink and grinds food and materials thrown into the drain into material small enough to be flushed through the drainpipes.

Because they contain motors and gears and have a strong housing, garbage disposal units tend to be heavy. Consequently, mounting such a heavy device to the bottom end of a disposal sink flange can be a challenging task. Conventionally, rotationally engaged flanges extend from the drain in the sink and are mated with a cooperating mounting ring flange which is rotationally positioned on the garbage disposal. Engaging the two flanges using rotation of one to cooperatively engage with the other, a compression fit of the disposal to the sink is created which is a leak-proof engagement. During a conventional installation under a sink, the plumber or installer of the disposal unit generally lays down on his back with his head under the sink. While in this cramped uncomfortable position, the plumber must then manipulate the disposal into place in the dark and tight space under the sink. While holding the heavy disposal elevated and perpendicular to the ground, the plumber must then accurately rotationally engage the sink mounted flange by rotating the disposal engaged mounting ring flange.

Conventionally, the engagement components for disposals to sinks which are employed in this mount have evolved a commonality amongst manufacturers. A majority of such garbage disposal units are engaged to the sink drain using this mating pair of rotatably engageable flanges. The upper flange or sink flange is normally engaged to the strainer assembly extending from the drain above to a position beneath the sink and is in a fixed position thereon. This upper flange is installed to the strainer assembly prior to the engagement of the disposal unit.

The disposal unit conventionally has a lower mounting ring flange engaged around its exterior adjacent to the upper or garbage intake aperture of the disposal unit. This lower mounting ring flange is adapted to rotationally engage with the upper flange, using a twist to engage a plurality of engageable ramps. Each of these ramps are positioned around an interior circumference defining an aperture in the lower mounting ring flange. These ramps begin at notches formed in the lower mounting ring interior circumference. To properly engage the disposal to the sink drain, the ramps on this lower mounting ring must all be concurrently placed in registered engagement with mating portions of similar ramps on the upper mounting ring flange. Thereafter, while holding both the lower ring flange and the heavy disposal unit to which it is engaged, the lower mounting ring flange must be rotated to force the lower flange to an engagement with the upper flange and thereby place the disposal unit into a sealed engagement with the drain outlet on which the upper flange is engaged.

This engagement of the mounting rings is a step in the process which is rendered most difficult for a number of reasons. A primary challenge is the fact that the installer must hold the heavy and bulky disposal unit elevated. At the same time the lower mounting flange, engaged upon or adjacent to the mouth of the disposal, must be elevated with the disposal unit and placed into a registered engagement with the upper mounting ring flange in its fixed engagement with the sink drain in order to allow for the next step of rotating the lower ring. This step of elevation and engagement can be both frustrating and dangerous since the installer is generally laying face up and lifting the heavy disposal motor assembly over his head with one hand, while attempting to engage and secure the upper and lower mounting ring flanges together by rotating them with the other hand.

Even if the installer, in this dark and cramped environment, is able to get the lower mounting ring properly started upon the ramps of the upper mounting ring flange, the next step requires that the lower mounting flange ring be rotated and that the plurality of ramps on both the upper and lower mounting rings, remain engaged for the entire process. This can be a daunting requirement in that the heavy disposal unit must be maintained elevated and substantially perpendicular to the axis of the sink drain to maintain the upper and lower mounting ring flanges in a proper registration to be properly engaged.

Still further, there is a considerable amount of force required to twist the lower mounting ring flange along the ramped engagement with the upper mounting ring flange to force the engaged and heavy disposal unit upward toward the sink and into a sealed engagement. The installer, therefore, must overcome the frictional engagement of the upper and lower mounting ring flanges during the rotation of the lower mounting ring flange, the weight of the disposal unit pushing downward on the lower mounting ring flange, and the requirement to compress a seal against the sink drain. To help installers make this engagement, manufacturers conventionally provide a plurality of projections extending from the exterior circumference of the lower mounting ring flange. These hollow projections are provided for the installer to engage and impart the mounting rotational force to the mounting ring. Frequently, the manufacturers of the disposals instruct that a small hex wrench be engaged into one of these projections to provide the user with a small lever to impart more force, allowing for the twisted engagement of the upper and lower mounting ring flanges. Of course this small wrench must be concurrently engaged in a small hole in one of the projections, as the installer is holding the heavy disposal unit elevated overhead and trying to keep the upper and lower mounting rings in the required registered parallel engagement, to achieve a sealed attachment of the disposal to the sink.

As a result, installers frequently fail to maintain all of the mating surfaces of the upper and lower mounting ring flanges in registration while concurrently holding the heavy disposal unit and while concurrently trying to engage the small hex wrench with one projection of the lower mounting ring flange. This results in an improper engagement that sometimes is not noticed until a leak test. Or, it can result in an engagement that causes the heavy disposal unit to fall on the head of the installer who unfortunately believes he has accomplished all the concurrent and tricky maneuvers properly.

As such, there exists an unmet need for a tool adapted to concurrently provide at least one and preferably a two-handed engagement to achieve an elevation of the heavy disposal unit, while concurrently providing a mechanical advantage to generate the force necessary to engage the upper and lower mounting ring flanges in their frictional engagement. Such a device should make it easy to maintain the disposal unit perpendicular to the axis of the sink drain and concurrently provide a means to engage one or a plurality of the manufacturer-provided projections extending around the exterior circumference of the lower mounting ring flange that is rotationally engaged upon the disposal unit. Still further, such a device should be easily disengaged once a secure mount between the upper and lower mounting rings is achieved.

In this respect, before explaining at least one embodiment of the tool for disposal engagement invention in detail, it is to be understood that the invention is not limited in its application to the details of construction and to the arrangement of the components set forth in the following description or illustrated in the drawings nor the steps outlined in the specification. The invention is capable of other embodiments and of being practiced and carried out in various ways as those skilled in the art will readily and immediately ascertain from reading this application. Also, it is to be understood that the phraseology and terminology employed herein are for the purpose of description and should not be regarded as limiting.

As such, those skilled in the art will appreciate that the conception upon which this disclosure is based may readily be utilized as a basis for designing other methods and systems for carrying out the several purposes of the present invention which is a significant improvement to the task of engaging a garbage disposal to a sink outlet. It is important, therefore, that the claims be regarded as including such equivalent construction insofar as they do not depart from the spirit and scope of the present invention.

OBJECTS OF THE INVENTION

An object of this invention is the provision of a tool to operatively engage the rotating lower mounting ring with a sink-engaged upper mounting ring.

An additional object of this invention is the provision of such a tool which also provides at least one extending member to provide mechanical advantage to impart the force necessary for such a mounting ring engagement.

A further object of this invention is the provision of opposing hand grips to allow the installer of a garbage disposal a secure grip for both hands to better raise and balance the heavy garbage disposal during installation.

Yet another object of this invention is the provision of such a tool which allows the installer to concurrently hold the disposal unit elevated with both arms, in a level position, while engaging the upper and lower mounting rings together for a subsequent rotational engagement.

These together with other objects and advantages which will become subsequently apparent reside in the details of the construction and operation of the device herein as more fully hereinafter described and claimed, reference being had to the accompanying drawings forming a part thereof, wherein like numerals refer to like parts throughout.

SUMMARY OF THE INVENTION

The device as shown and described in the various preferred embodiments provides the user with a stable and easy way to employ a tool for the installation of garbage disposal units which employ a rotational engagement of an upper and lower mounting ring in the mounting process. In a first mode of the device, which yields the most compact tools of engagement, one or preferably a pair of engageable handles are provided, both of which are adapted to frictionally engage with the lower mounting ring to provide rotational torque and concurrently employ a portion of the handle as a body to cradle it during lifting.

In another mode of the device, which is larger but more easily employed, the device features two handles and features a substantially "C" shaped central body portion. The body portion has an opening on one side adapted to pass over the exterior circumference of a garbage disposal housing. The central body has at least one and preferably two of the projecting handles for torque and lifting. The central body is adapted to cradle the projections of the lower mounting ring during lifting of the disposal into place. It is preferred that the handles angle downward from engagement to the body portion to provide more working space for the user and keep their hands out of the way of sinks and drain pipes.

This cradling means is provided by a plurality of notches which are formed into and which extend from an upper surface of the body portion to an interior edge of an aperture which defines an interior relief communicating with the opening on the one side of the central body. These notches are sized and positioned to engage with a plurality of the projections conventionally extending from the exterior circumference of the lower mounting ring engaged around the opening end of the disposal unit. This multiple engagement provides a means to securely hold the lower mounting ring upon the central body portion of the device, while the disposal is being lifted by the wrench engaged to the lower ring and imparting its weight onto the lower mounting ring. The notch and projecting engagement also provide a means to uniformly impart rotational force to the lower mounting ring on the disposal unit to engage it with the upper mounting ring fixed on the sink drain.

While the central body portion of the device can be employed by itself with no handles and still be an improvement on the state of the art which requires complex hand and body manipulation to achieve the rotational mounting ring engagement, at least one projecting handle is preferred. The handle so projecting provides the user with a lever to achieve mechanical advantage or impart sufficient torque to the lower mounting ring to properly engage it with the upper mounting ring.

As noted, particularly preferred are two handles projecting in opposite directions from the body portion or from respective engagement with the lower mounting ring without the body portion. Two such handles double the mechanical advantage available to the user, but more importantly, they allow the user dual and solid projecting grips, both of which may be employed to allow the user to use both arms to raise and maintain the disposal unit level during an installation.

In the mode of the device employing a central body, the notches around the interior circumference are configured in a manner to allow a secure, yet removable engagement with the exterior edges of the projections emanating from the lower mounting rings of modern garbage disposals.

While shown in a number of fashions herein, it should be noted that there are numerous other configurations of portions of the interior circumference of the device which those skilled in the art will ascertain upon reading this disclosure. Consequently, any such configuration of the interior edge of the device as will engage at least one of the projections from a lower mounting ring and maintain that mounting ring parallel with the plane of the body of the device, is anticipated within the scope of this invention.

Currently shown are beveled notches formed in the upper surface to the interior edge of the body portion at the interior circumference and a hook-shaped notch adapted to engage and hold cavities communicating through some projections extending from the lower mounting rings of some manufacturers.

In use, with the lower mounting ring engaged to the disposal, the device is engaged to an as-used position wherein the user may support both the mounting ring, and the disposal to which its engaged. In one mode of the device a single handle provides both means to engage the ring and support it. However, since most people work better with two hands, a preferable mode uses two handles adapted with members to engage with the axial cavity extending through each of the projections of the lower mounting ring. This engagement also provides a cradling of the projection when the handles are rotated to an installation position from a substantially vertical engaging position. By allowing a vertical engagement and rotation to frictionally engage the extending members when the handles reach a horizontal plane, the handle or handles are easily engaged in the cramped quarters under the sink. When two handles are employed, once rotated to a horizontal position, they provide a cradle to the lower surface of projections from the mounting ring and a compressive engagement of the member projecting through the axial cavity of the projection and the cradling surface area of the handle. So engaged, in an as-used position, two such handles project from opposite sides of the lower mounting ring allowing a balanced two handed lift and rotation of the ring concurrently with elevating the disposal.

Some users may prefer the other noted mode of the device which provides a central body portion for the two handles since the body maintains the parts in a unitary structure which is not easily lost. In use of this mode of the device, the user will slide the device over the housing of the disposal unit placing the housing inside the interior aperture of the body portion of the device. At least one and preferably a plurality of the projection engaging means are then engaged to cradle the projections extending from the exterior of the lower mounting ring. This is done by placing the body portion of the device below the lower mounting ring and raising the device to allow the cradled engagement of the projections of the lower mounting ring.

So engaged, in the as-used position, the device may then be employed to lift the disposal using the body portion along with one or preferably two handles extending from the body for the hands and arms of the user. Raised and held elevated, the device may concurrently be employed to engage the lower mounting ring with the upper mounting ring to a first position and then to rotate the lower mounting ring to a frictional engagement with the upper mounting ring.

Once this frictional engagement is achieved, the device may be easily removed by disengaging the projections and sliding the device through the opening and off of the housing of the disposal unit. All the while, the body portion is maintained substantially parallel to the lower mounting ring making it easy to maintain the disposal perpendicular to the axis of the sink drain which is required to engage all of the ramps of both mounting rings.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing description and following detailed description are considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention.

BRIEF DESCRIPTION OF THE DRAWINGS

FIG. 4 depicts a top plan view of another mode of the device which employs a body portion engaged to projecting handles.

FIG. 5 depicts a slice through FIG. 4 along line 5 and showing the cradling of the rotatable mounting ring engaged to conventional disposals.

FIG. 6 shows a depiction of a slice along the axis of the device of FIG. 4 showing a snap ring expanding portion.

FIG. 7a shows the pins mode of supporting the mounting ring in axial engagement with the projections.

DETAILED DESCRIPTION OF THE INVENTION

Figure 1:
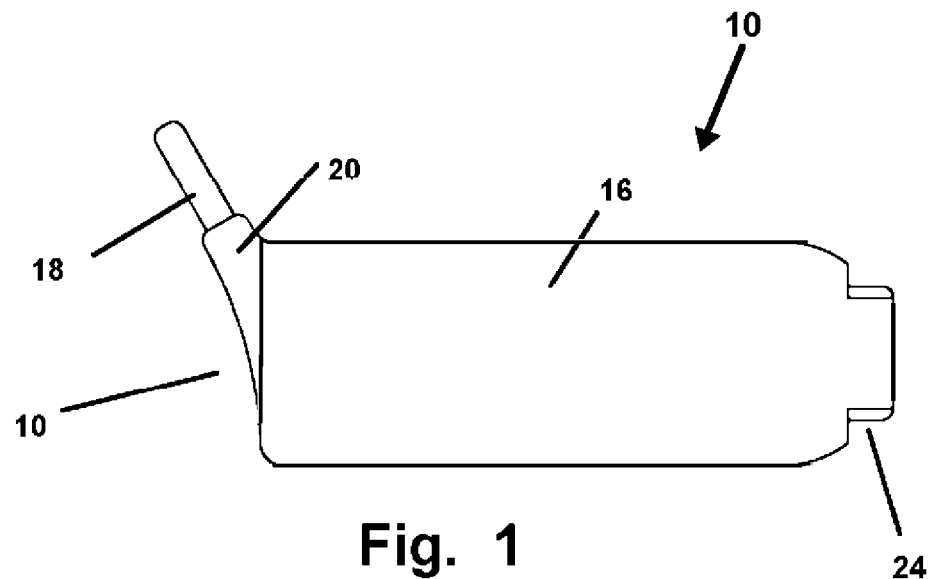
FIG. 1 depicts a top plan view of a simple mode of the device wherein the body is provided by a handle adapted for a cradled engagement of projections extending from the lower mounting ring of a conventional garbage disposal.
Figure 2:
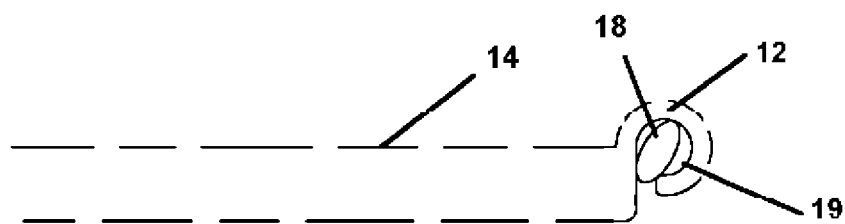
FIG. 2 is an end view of the device of FIG. 1 showing the oval shaped projection rotated to an engaged position with the lower mounting ring where a notch cradles the exterior of the projection.
Figure 3:
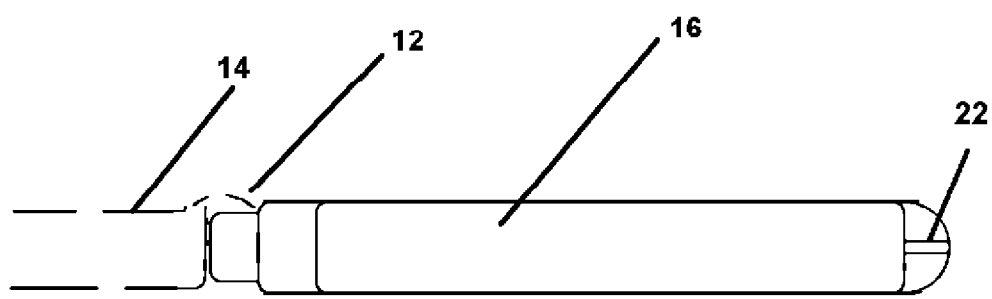
FIG. 3 depicts a side view of the device of FIG. 1 showing a snap ring expander formed therein.

Referring now to the drawings in FIGS. 1-8, wherein similar parts of the device 10 are identified by like reference numerals. There is seen in FIG. 1 a top plan view of a mode of the device 10 adapted to engage the projections 12 extending from the conventional lower mounting ring 14 employed by manufacturers to engage a garbage disposal to a sink drain.

This mode of the device 10 features a handle 16 having an oval pin 18 extending at an angle from a first end. The oval shape of the pin 18 provides a means for rotational engagement with the axial cavity 19 of the projection 12 extending from the lower mounting ring 14. The pin 18 is engaged with the axis running through its points parallel to the side edge of the mounting ring 14. Once so inserted, the handle 16 is rotated such that a depression 20 formed in a side surface adjacent to the pin 18 cradles the exterior surface of the projection 12 extending from the lower mounting ring 14.

Additional utility is provided by a snap ring expansion notch 22 at the distal end of the handle 16. This notch 22 is formed into opposite sides of a cutaway 24 in the handle 16 and allows the user to engage the snap ring conventionally employed to engage the upper mounting ring (not shown) to the disposal. The notch 22 may be employed with all modes of the device 10 herein and is especially useful to the user by eliminating a tool required which many do not own.

FIG. 4 depicts a top plan view of another mode of the device 11 which employs a body portion 26 engaged to projecting handles 16. As noted, the central body portion 26 of the device 11 can be employed by itself, with no handles 16 and still be an improvement on the state of the art. At least one projecting handle 16 is preferred. To provide ease of installation while raising a heavy disposal, two handles 16 work best such that both arms of the user may be employed to raise and maintain the disposal unit level during an installation.

In this mode of the device 11 employing a central body portion 26 a plurality of notches or depressions 20 around the interior circumference of an aperture 21 in the body portion 26 are configured in a manner to allow a secure, yet removable engagement, in an as-used position, with the exterior edges of the projections 12 emanating from the lower mounting rings 14 of modern garbage disposals. The current mode of the device 11 employs beveled notches formed in the upper surface adjacent to the interior edge of the aperture 21 in the body portion 26. Hook shaped pins 17 horizontally disposed are provided and are adapted to engage and communicate through the axial cavities 19 in conventional projections 12 from lower mounting rings 14.

FIG. 5 depicts a slice through FIG. 4 along line 5 showing the depression 20 cradling the projection 12. FIG. 6 is a horizontal section through FIG. 4 showing the depression 20 and notches 22 to engage and enlarge the snap rings used for such installations. The snap ring notches 22 are also shown in the other figures and allow the user to slide the open portion of a snap ring thereon and expand its circumference temporarily.

Figure 7:
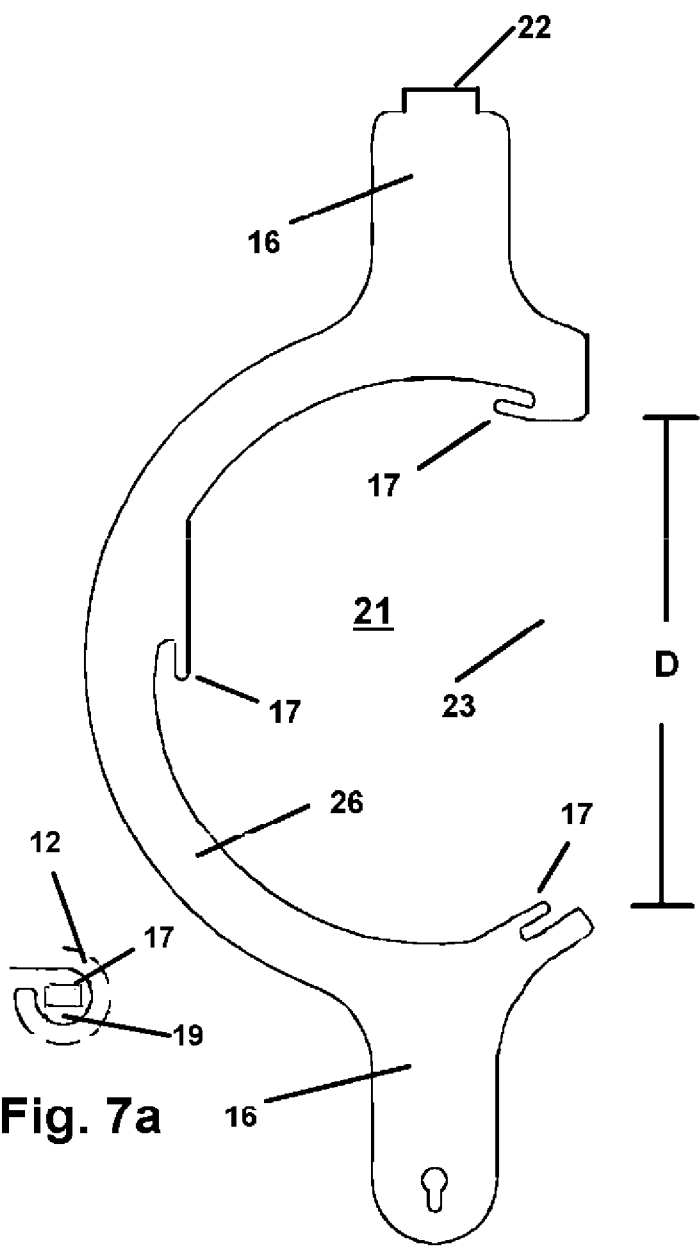
FIG. 7 shows another mode of the device having pins extending in one direction around the inside edge of an aperture in the body portion which are adapted to engage the lower mounting ring.

FIG. 7 shows another mode of the device wherein the means to engage the projections 12 from the lower mounting ring 14 are pins 17 which project horizontally along the inside edge of an aperture 21 in the body portion 26 of the device 10. An opening 23 has a diameter "D" that is adapted to slide over the outside circumference of a garbage disposal unit such that the device 10 is slid upon the disposal and then raised under the disposal-engaged lower mounting ring 14 and rotated to engage the pins 17 within the axial cavities 19 on the mounting ring. Thereafter, the disposal, with lower mounting ring 14 engaged, may be raised by lifting the handles 16 until the lower mounting ring 14 engages the upper mounting ring on the sink.

Figure 8:
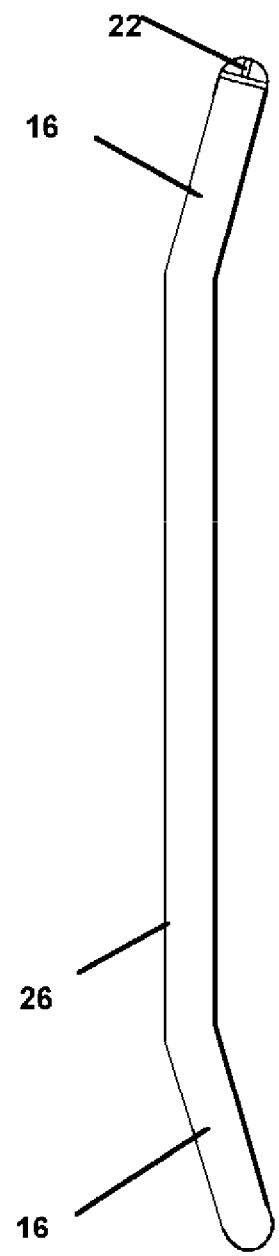
FIG. 8 shows a side view of FIG. 7 and the angled handles which are preferred and may be employed with all modes of the device herein.

As can be discerned in FIGS. 7-8, the handles 16 provide a concurrent means to elevate and rotate the mounting ring 14 and provide a means to generate the torque for a mechanical advantage while engaging the mounting ring rotationally to the upper flange on the sink. Particularly favored in the modes of the device from 4-8 is the downward slant of the handles 16 from the body portion 26. Under sinks are especially cramped where the drain intersects the plumbing and the downward slant has been found to provide a means to position the users hands away from the sink and cramped quarters adjacent to it while still providing the leverage to lift the disposal and rotate the mounting ring 14.

As noted earlier, the device and method of employment shown in the drawings and described in detail herein disclose arrangements of elements of particular construction, and configuration for illustrating preferred embodiments of the structure of the present garbage disposal installation tool. It is to be understood, however, that elements of different construction and configuration, and using different steps and process procedures, and other arrangements thereof, other than those illustrated and described, may be employed for providing a garbage disposal tool in accordance with the spirit of this invention.

As such, while the present invention has been described herein with reference to particular embodiments thereof, a latitude of modifications and various changes and substitutions are intended in the foregoing disclosure. In some instances some features of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

Further, the purpose of the abstract of the invention, included in this specification, is to enable the U.S. Patent and Trademark Office, the public generally and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting, as to the scope of the invention in any way.

What is claimed is:

1. A tool for supporting a garbage disposal having a circular first mounting ring rotationally engaged on one end, in an elevated position, and rotate said first mounting ring to operative engagement with a second mounting ring positioned below a drain of a sink, said tool comprising:
   a substantially c-shaped body having a central aperture therein and having a gap in said body communicating with said central aperture;
   a first handle, said first handle extending away from an engagement with said body at a first end, to a distal end;
   a second handle extending from a respective engagement of a respective first end thereof to said body, to a respective distal end;
   said first handle and second handle extending in opposite directions from said body;
   said gap sized to pass said garbage disposal therethrough into said central aperture;
   said body configured with a depression in a first surface of said body adapted to engage at least one projection extending from said first mounting ring in a removable mating engagement while supporting said mounting ring and a weight of said garbage disposal engaged therewith, in an as-used position of said tool, in a contact of a lower surface of said first mounting ring against said first surface of said body;
   whereby an elevation of said tool in said as-used position above a support surface, concurrently elevates said mounting ring and said garbage disposal; and
   wherein a rotation of said tool in said as-used position imparts a concurrent rotation to said first mounting ring, whereby said first mounting ring is thereby operatively engaged with said second mounting ring to thereby position said garbage disposal to a mounted position with said sink.

2. The tool for supporting a garbage disposal of claim 1 wherein a plurality of said depressions are positioned upon said first surface of said body in positions adapted to engage with a plurality of respective said projections extending from said body.

3. The tool for supporting a garbage disposal of claim 1 wherein said two handles extend from said body in said opposite directions from angled engagements to said body; and said angled engagements positioning said distal ends of each of said first handle and said second handle at a lower elevation than said body, while in said as-used position.

4. The tool for supporting a garbage disposal of claim 2 wherein said two handles extend from said body in said opposite directions from angled engagements to said body; and said angled engagements positioning respective said distal ends of each of said first handle and said second handle at a lower elevation than said body, while in said as-used position.

\* \* \* \* \*